(12) United States Patent
Staton et al.

(10) Patent No.: US 10,088,011 B1
(45) Date of Patent: Oct. 2, 2018

(54) DAMPING ADHESIVE

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/678,392

(22) Filed: Aug. 16, 2017

Related U.S. Application Data

(62) Division of application No. 15/365,923, filed on Nov. 30, 2016, now Pat. No. 9,759,286.

(51) Int. Cl.

| | |
|---|---|
| *F16F 7/00* | (2006.01) |
| *F16F 15/02* | (2006.01) |
| *F16F 15/00* | (2006.01) |
| *C09J 7/20* | (2018.01) |

(52) U.S. Cl.
CPC .......... *F16F 15/022* (2013.01); *F16F 15/002* (2013.01); *C09J 7/20* (2018.01); *F16F 2224/02* (2013.01); *F16F 2224/0283* (2013.01)

(58) Field of Classification Search
None
See application file for complete search history.

(56) References Cited

U.S. PATENT DOCUMENTS

| | | | |
|---|---|---|---|
| 4,690,960 A * | 9/1987 | Yamauchi | C08K 3/22 248/562 |
| 4,860,851 A | 8/1989 | Krevor et al. | |
| 5,902,656 A * | 5/1999 | Hwang | F16F 1/38 138/112 |
| 5,946,866 A * | 9/1999 | Weglewski | E04H 9/022 52/167.1 |
| 9,317,044 B2 | 4/2016 | Zhuge et al. | |
| 9,371,669 B2 | 6/2016 | Berg et al. | |
| 9,759,286 B1 * | 9/2017 | Staton | F16F 15/022 |
| 2006/0155036 A1 * | 7/2006 | Ackermans | B82Y 30/00 524/445 |
| 2007/0128960 A1 | 6/2007 | Nejhad et al. | |
| 2007/0138583 A1 | 6/2007 | Ofek et al. | |
| 2007/0224454 A1 | 9/2007 | Ingvarsson et al. | |
| 2008/0085405 A1 * | 4/2008 | Prenzel | B32B 27/32 428/220 |
| 2008/0139722 A1 | 6/2008 | Shefelbine et al. | |
| 2009/0050428 A1 | 2/2009 | Kloucek et al. | |
| 2009/0326140 A1 | 12/2009 | Shimada et al. | |
| 2010/0089772 A1 | 4/2010 | Deshusses et al. | |
| 2010/0108306 A1 | 5/2010 | Cooper | |
| 2011/0051775 A1 | 3/2011 | Ivanov et al. | |
| 2011/0171137 A1 | 7/2011 | Patolsky et al. | |
| 2015/0152933 A1 | 6/2015 | Yeh et al. | |
| 2015/0183975 A1 | 7/2015 | Clapper et al. | |
| 2015/0210899 A1 | 7/2015 | Ryan et al. | |
| 2016/0040743 A1 | 2/2016 | Staton | |
| 2016/0046501 A1 | 2/2016 | Kverel et al. | |
| 2016/0309260 A1 | 10/2016 | Bohm et al. | |
| 2016/0363727 A1 | 12/2016 | Suntsova et al. | |

FOREIGN PATENT DOCUMENTS

| | | | | |
|---|---|---|---|---|
| WO | WO-2014168662 A2 * | 10/2014 | | B32B 15/14 |

OTHER PUBLICATIONS

PCT Application No. PCT/US17/63864, International Search Report and Written Opinion, dated Feb. 1, 2018, 12 pages.

* cited by examiner

*Primary Examiner* — Anish P Desai
(74) *Attorney, Agent, or Firm* — Lathrop Gage L.L.P.

(57) ABSTRACT

Adhesive damping systems are described. A damping system for reducing the effects on a substrate caused by a disruption in the substrate environment includes an adhesive having a plurality of three-dimensional particles dispersed therein. The particles are configured to provide a controlled response to an applied force field. The system further includes a sensor which measures an amplitude and frequency spectrum of the disruption. In a use configuration, the sensor determines the amplitude and frequency spectrum of the disruption received by the substrate; and the applied force field is dependent on the amplitude and frequency spectrum of the disruption.

12 Claims, 9 Drawing Sheets

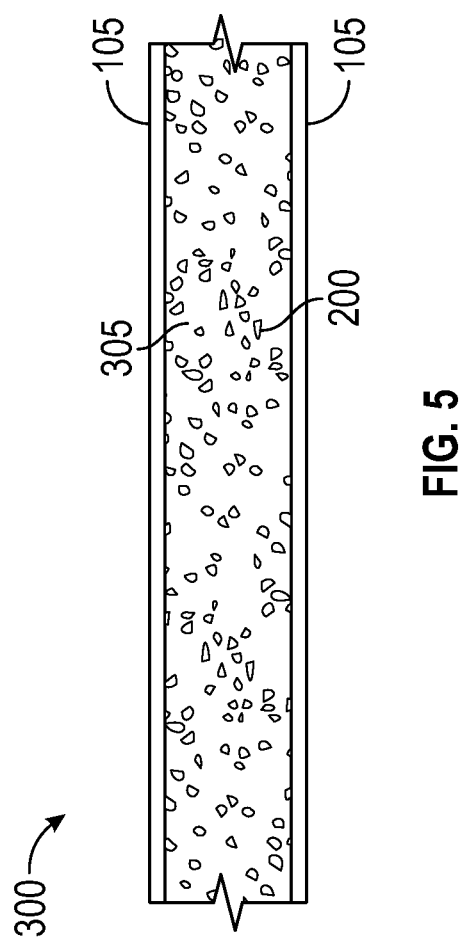

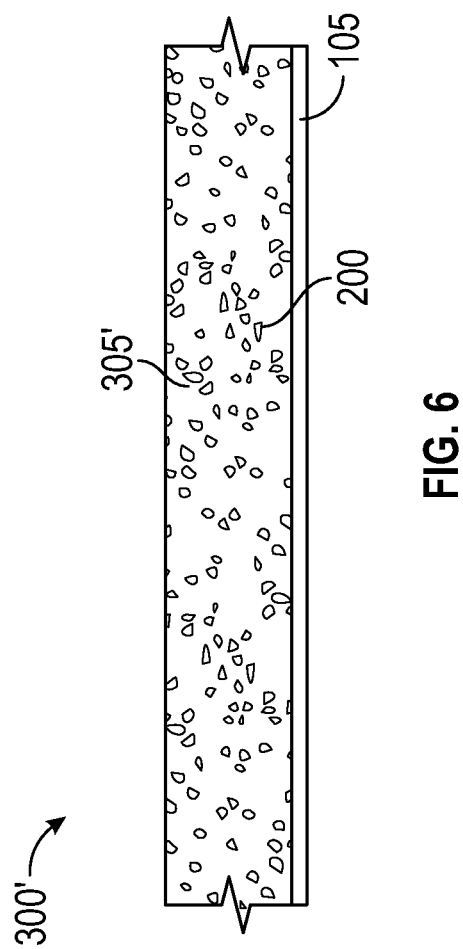

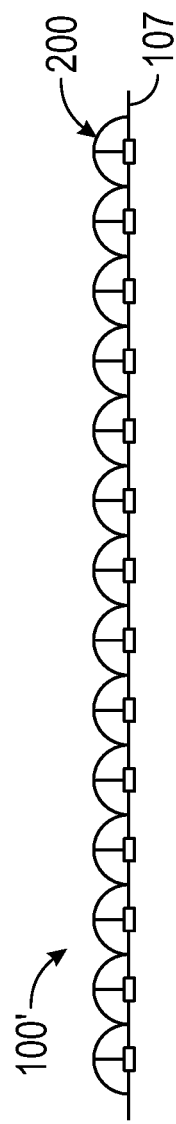
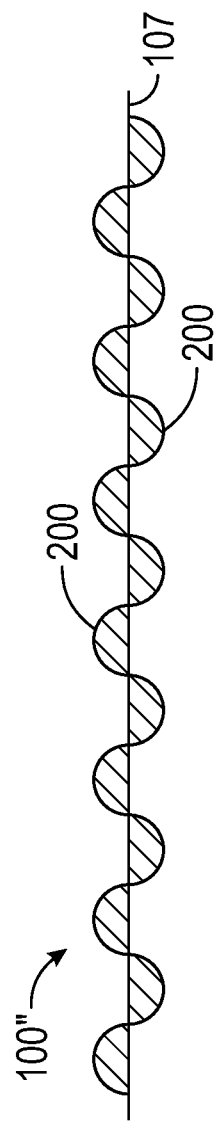
FIG. 7A
FIG. 7B

DAMPING ADHESIVE

RELATED APPLICATIONS

This application is a divisional application claiming priority to U.S. patent application Ser. No. 15/365,923 filed Nov. 30, 2016, the disclosure of which is incorporated herein in its entirety by reference.

BACKGROUND

Adhesives have been in use for hundreds of years, perhaps even dating back as far as 2000 BC. Since naturally occurring adhesives were discovered, they have been in continuous use to bind pieces of material together. Advancements in adhesives have developed gradually over time, with the greatest enhancements taking place in the $20^{th}$ century with the development and production of particular plastics and resins that exhibit particular characteristics which may be beneficial in certain bonding applications. Adhesives may be organized by the particular methods of adhesion: non-reactive and reactive, the difference being whether the adhesive chemically reacts in order to harden. Adhesives may be formed from naturally occurring materials (bioadhesives), or may be synthetic. Generally, the type of adhesive is selected based on the required degree of adhesion between the two materials.

Ever since their development, adhesives have been used in every industry for everything from constructing containers to adhering shingles to a roof, and nearly everything in between. Adhesives provide several advantages over other binding techniques such as sewing, mechanical fastening, etc., including the ability to bind together dissimilar materials, make design choices that would otherwise be unachievable, and more efficiently distribute stresses across a joint, to name a few. However, adhesives also suffer from several disadvantages. Adhesives may experience decreased stability at less than ideal conditions (i.e., at high or low temperatures). Further, the larger the objects, the more difficult it becomes to adhere the objects together if the bonding surface area is small. Finally, where a high degree of adhesion is desirable so that the materials do not become separated, it may be difficult to also provide a sufficient degree of flexibility to allow the materials to expand and contract due to changes in the environment surrounding the adhered objects. As a result, the adhesive, or even the object itself, may malfunction.

It shall be appreciated from the foregoing, therefore, that prior art adhesives present problems that are in need of solutions and there is a need for an adhesive having increased flexibility for damping purposes that may be used in conditions where such damping characteristics are desirable.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, an adhesive having damping properties has an adhesive having a three-dimensional particle dispersed therein. In a use configuration, an initial applied energy received by the substrate causes the particle to compress from a natural expanded state to a compressed state. The three-dimensional structure subsequently returns to its expanded state, thereby imparting an opposing energy on the substrate which is less than the initial applied energy received by the substrate.

In another embodiment, a damping system for reducing the effects on a substrate caused by a disruption in the substrate environment includes an adhesive having a plurality of three-dimensional particles dispersed therein. The particles are configured to provide a controlled response to an applied force field. The system further includes a sensor which measures an amplitude and frequency spectrum of the disruption. In a use configuration, the sensor determines the amplitude and frequency spectrum of the disruption received by the substrate; and the applied force field is dependent on the amplitude and frequency spectrum of the disruption.

In still another embodiment, a damping system for reducing the effects on a substrate caused by a disruption in the substrate environment has an adhesive having a backing and an adherent on at least one side of the backing and a plurality of three-dimensional particles dispersed within the backing. The adherent is adhered to the substrate. The particles are configured to provide a controlled response to the disruption. In a use configuration, the disruption received by the substrate causes the particle to oscillate between a first and second position, which causes an opposing force on the substrate which is less than the disruption received by the substrate. The opposing force acts to reduce the effects of the disruption.

In still yet another embodiment, a damping system for reducing the effects on a substrate caused by a disruption in the substrate environment includes an adhesive component comprising a backing and an adherent on at least one side of the backing. A plurality of three-dimensional particles is dispersed within the backing. In a use configuration, the disruption received by the substrate causes the particle to oscillate between a first and second position, the oscillation causing an opposing force on the substrate which is less than the disruption received by the substrate, the oscillation acting to reduce the effects of the disruption.

In a further embodiment, a damping system for reducing the effects on a substrate caused by a disruption in the substrate environment comprises an adhesive component comprising a backing and an adherent on at least one side of the backing. The adherent is configured to adhere to a substrate. A plurality of a first type of three-dimensional particles is dispersed within the adherent and a plurality of a second type of three-dimensional particles dispersed within the backing. The particles are physically displaced in response to an applied force.

In still another embodiment, a damping system for reducing the effects on a substrate cause by a disruption in the substrate environment has an adhesive component comprising a backing and an adherent on at least one side of the backing. A plurality of three-dimensional particles is dispersed within the adherent. The particles are physically displaced in response to the disruption. The adherent is configured to adhere to a substrate.

BRIEF DESCRIPTION OF THE DRAWINGS

FIG. 5 is a side view of a backing with adhesive on two sides, the backing having three-dimensional damping apparatus dispersed throughout.

FIG. 6 is a side view of a backing with adhesive on a single side, the backing having three-dimensional damping apparatus dispersed throughout.

FIG. 7a is a side view of an adhesive tape incorporating damping apparatus according to another embodiment of the invention.

FIG. 7b is a side view of an adhesive tape incorporating damping apparatus according to yet another embodiment of the invention.

DETAILED DESCRIPTION

Figure 1:
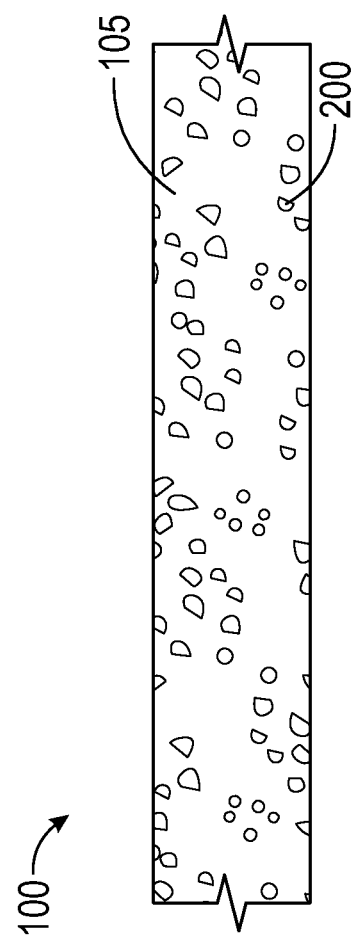
FIG. 1 is a close-up perspective view of an adhesive having three-dimensional damping apparatus dispersed throughout according to one embodiment of the invention.

Adhesives may be organized into two categories based on whether the adhesive chemically reacts in order to harden and therefore bond. As the name would suggest, non-reactive adhesives do not require a chemical reaction to achieve the desired bond. Types of non-reactive adhesives include drying adhesives, pressure-sensitive adhesives (PSAs), contact adhesives, and hot melt adhesives. Drying adhesives may be further categorized into solvent-based adhesives and polymer dispersion adhesives. In solvent-based adhesives, a mixture of ingredients, which may include polymers, are dissolved in a solvent. As the solvent evaporates, the adhesive hardens, forming the bond. Some well-known solvent-based adhesives include white glue, contact adhesive (i.e., contact cement), and rubber cement. The bonding capability of the adhesive on different materials depends largely on the chemical characteristics of the adhesive. Therefore, an adhesive with a specific chemical composition may be selected for use with materials for which the effectiveness of the adhesive is known.

Polymer dispersion adhesives are typically formulated from polyvinyl acetate (PVAC), acrylics, styrene-butadiene rubber (SBR), natural rubber latex, synthetic elastomers, and polyurethane, for example. The solid polymer is dispersed throughout an aqueous phase (e.g., water). In one embodiment, after application of the adhesive, and while the adhesive is wet, the substrates are joined together. As water is lost, the bond is formed between the substrates. These types of polymer dispersion adhesives are often used with woodworking, packaging, and even fabrics and fabric based components. Polymer dispersion adhesives may also take the form of a contact adhesive (further described below), wherein adhesive is applied to the bonding surface of both substrates and the coated substrates are brought into contact using only enough pressure to ensure contact of the bonding surfaces. A bond is immediately formed as a result of the contact of the bonding surfaces, and the strength of the bond is increased as the films comingle. Contact adhesives tend to have higher bonding strength, heat resistance, and creep resistance than wet bonded adhesives.

Pressure sensitive adhesives are typically based on an elastomer compound (e.g., acrylics, butyl rubber, ethylene-vinyl acetate, natural or silicone rubber, nitriles, styrene block copolymers, vinyl ethers, etc.) in combination with a tackifier, (e.g., rosin esters, terpenes, aliphatic and aromatic resins, hydrogenated hydrocarbon resins, terpene-phenol resins, etc.) if needed. PSAs are configured to form a bond as a result of pressure applied to the bonding surface. Pressure sensitive adhesives form a bond because the adhesive applied to a bonding surface is soft enough to flow such that it wets the adherent. When adhesive is applied to a substrate bonding surface, and pressure is applied to the substrate bonding surface mated with a bonding surface of an adherent, the PSA resists flow and a bond is formed. Molecular interactions, such as van der Waals forces, may increase the strength of the bond. PSAs do not require any solvent, heat, or water to activate the adhesive. The degree of bond is directly influenced by the amount of pressure which is used to join the bonding surfaces, though surface characteristics (e.g., smoothness, contaminants, etc.) of the bonding surfaces may influence the maximum achievable bond strength.

PSAs may be configured for permanent or removable applications. Common permanent applications include safety labels for power equipment, foil tape for HVAC duct work, automotive interior trim assembly, and sound/vibration damping films. Common removable applications include surface protection films, masking tape, note papers (e.g., Sticky notes), price marking labels, wound care dressings, etc.

Contact adhesives are configured for use where strong bond strength is required. Elastomers such as natural rubber and polychloroprene (commonly known as Neoprene) are frequently used contact adhesives. As noted above, the contact adhesive is applied to both substrates, and the adhesive may be allowed some time to dry before the substrates are mated together. Some contact adhesives may even take as long as 24 hours to dry on the individual substrate before it is advised to mate the substrates together. In some instances, a solvent, such as alcohol may be incorporated into the contact adhesive to allow for easier application of the adhesive, but which quickly evaporates once the adhesive is applied to the substrate. Once the substrates are placed into contact with each other, intermolecular diffusion causes the adhesive on the two substrates to auto-adhere. Contact adhesives may be especially useful where the substrates have a low porosity and a large surface bonding area. Because the contact adhesive is substantially dry prior to bonding the substrates together, there's no need for the solvent to evaporate in order for adhesion to occur.

Hot melt adhesives are thermoplastics which are applied in a molten form (e.g., from about 65 to 180 degrees Celsius). As the thermoplastic cools, it solidifies to form a bond. Ethylene-vinyl acetate (EVA) is a common hot melt adhesive which is widely used for crafting. Other types of thermoplastics include the use of polyolefins (e.g., polyethylene), polyamides and polyesters, polyurethanes, styrene block copolymers (SBC), polycarbonate, fluoropolymers, silicone rubbers, and polypyrrole to name a few. Tackifying agents, such as those described above, are often combined with the polymer to increase the bond strength. Additional additives may be added to the composition to influence the final composition of the thermoplastic adhesive. Hot melt adhesives are often used to seal packaging, bind books, product assembly, disposable diapers, in electronics, etc.

Reactive adhesives can be single-part adhesives, or multi-part adhesives. In general, reactive adhesives are characterized by the formation of permanent bonds between substrates which provide resistance to chemicals, moisture, and heat. One-part adhesives are generally acrylic-based. One-part adhesives harden as a result of a chemical reaction with an external energy source, such as radiation, heat, or moisture. One type of single-part adhesive is light curing materials; often ultraviolet light is utilized. Light curing adhesives can cure very quickly and may be useful for bonding dissimilar substrates for use in harsh environments. Heat curing adhesives may include a pre-made mixture of two or more components. When heat is applied, it may cause a reaction between the components which causes cross-linking of the bonds. Epoxies, urethanes, and polyimides are examples of heat curing adhesives. Moisture curing adhesives cure when in the presence of moisture, which may be provided on the surface of the substrate, or in the environment. Examples of moisture curing adhesives include cyanoacrylates and urethanes.

From the above discussion, it shall be understood that adhesives now come in many different compositions, and have many different characteristics that make the adhesive more suitable for a particular application than another. Each adhesive serves a particular purpose, whether it be the bonding of metal panels in a Navy ship where the selected adhesive is chosen based on its ability to firmly bind substrates together with a low likelihood of failure in less than ideal condition, or to affix parts of an electronic device together where the selected adhesive is chosen based on its ability to allow the materials to be bonded together but still flex to try to minimize breakage of the component parts. However, even with the advancements that have been made, no adhesive has yet been developed which is able to successfully ease the effects of energy transfer to or through the substrates.

For example, everything composed of matter is in a constant state of fluctuation and has a resonating frequency. If a given object is vibrated at its resonant frequency, or even a harmonic of that frequency, the object may be destroyed as a result of power amplification (i.e., power that is built-up over time at a precise frequency (the object's resonant frequency)). A very small amount of applied energy (i.e., forcing frequency) can thus cause destruction of a large object. Frictional forces (e.g., dampers) may be applied to an object to slow the motion of the resonating frequency and attenuate the amplification. Because adhesive is found in nearly every product, it may be an ideal substance to act as a damper. Indeed, the elastic nature of certain types of adhesives may, by themselves, act as a damper. However, the damping effects of the adhesive may be limited by the characteristics of the adhesive itself. Accordingly, an adhesive that has an increased ability to act as a damper in addition to an adherent is desirable.

In another example, a substrate may experience a physical shock, which may have detrimental effects. While an adhesive having flexible properties may be effective to reduce some of the effects of the shock, the adhesive may have limited flexible behavior and over time may begin to fail, becoming more brittle and therefore less able to deflect or dampen the shock such that the substrate remains undamaged. Accordingly, an adhesive having an increased ability to deflect or dampen a physical shock received by a substrate in addition to acting as an adherent is desirable.

In one embodiment of the invention, an adhesive is combined with a three-dimensional (3D) structure (or particle), for reducing the effect of energy transfer to or through one or more of the substrates to which the adhesive is applied. It shall be understood that the 3D structure or particle can include particles of different sizes and shapes, and may include but are not limited to sub-atomic particles, nano-particles, micro-particles, and macro-particles. It shall be further understood that "adhesive," in addition to referring to a single adhesive, shall also include an adhesive material consisting of a combination of multiple types of coordinating adhesives which may be strategically selected and provided as a layered medium (e.g., silicone rubber and polyurethane).

FIG. 1 illustrates a damping adhesive 100 comprising an adhesive 105 having a plurality of 3D structures 200 dispersed throughout. The 3D structures 200 may be mixed into a traditional adhesive (or into layers of a composition) to create a suspension, wherein the 3D structure 200 is suspended in the adhesive material. Alternately, as described below, the 3D structure 200 may be provided as part of a backing, wherein a conventional adhesive is applied to the backing and through the backing provides the damping effects.

Figure 2:
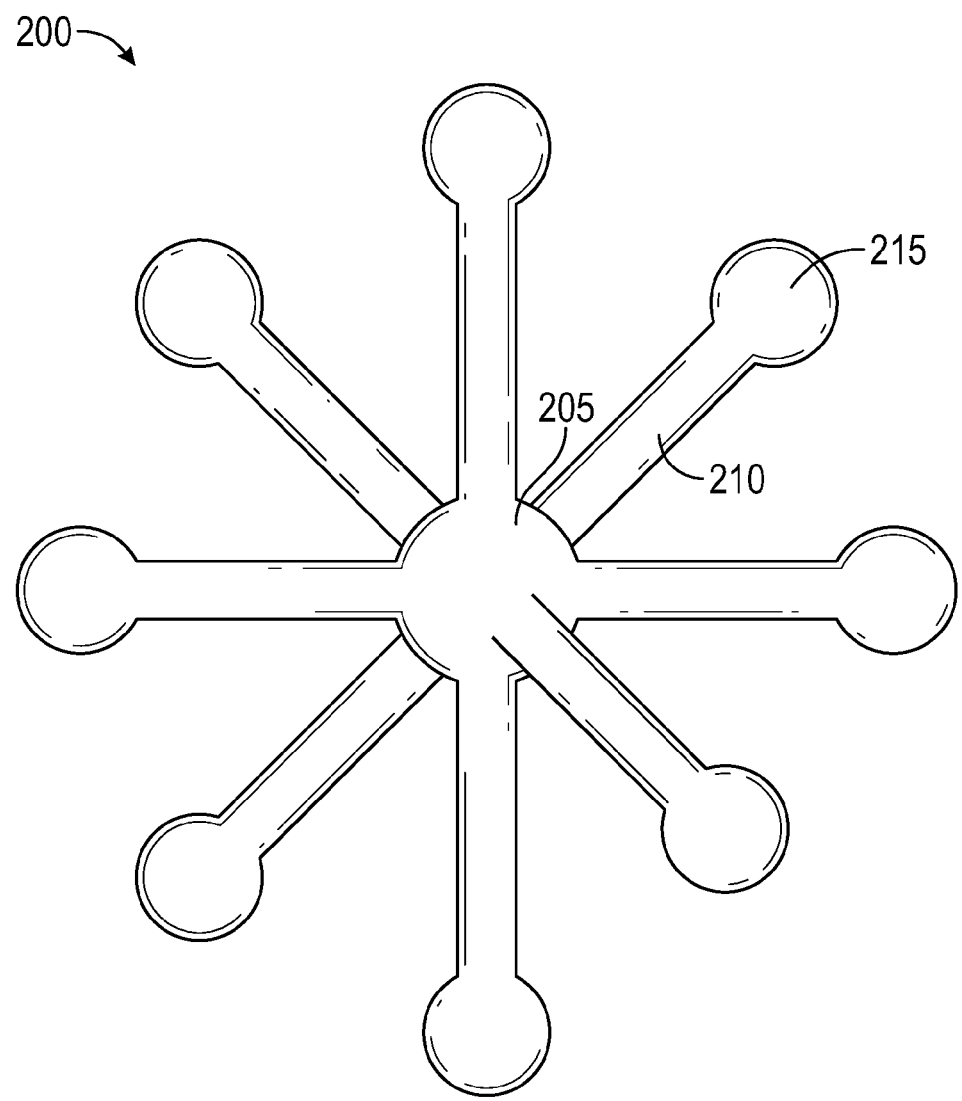
FIG. 2 is a close up perspective view of one embodiment of a three-dimensional damping apparatus.

FIG. 2 illustrates a 3D structure 200 according to one embodiment of the invention. The three-dimensional structure 200 may include a core 205 and a plurality of spokes 210 extending radially outwardly from the core 205. The spokes 210 may extend outwardly at a variety of angles. The structure 200 may be formed of one or more materials which give the structure 200 damping characteristics. Referring to the structure in FIG. 2, the spokes 210 may optionally include interaction elements 215 which may come into contact with one or more substrates as described below, or may simply be in contact with the adhesive 105. The interaction elements 215 may be useful for expanding the surface area of the contact point between the structure 200 and the substrate to ensure maximum damping effect.

The spokes 210 (and optionally the core 205 and/or interaction elements 215) may be formed from a material exhibiting superior flexibility and elasticity, such as thermoplastic polyurethanes (e.g., TPU 92A-1). Thermoplastic urethanes may exhibit durable elasticity, high resistance to dynamic loading, high abrasive resistance, quick response, and good temperature range. In one embodiment, the core 205, and optionally the interaction elements 215, may be formed of a material that exhibits greater stiffness than the spokes 210. In another embodiment, the core 205, and optionally the interaction elements 215, may be formed of a material that exhibits less stiffness than the spokes 210. In still another embodiment, the entire 3D structure 200 is formed of the same material. It shall be understood that any 3D molecule exhibiting acceptable flexible and elastic properties may serve as the structure. The material may be nonmagnetic.

In use, a plurality of 3D structures 200 may be combined with an adhesive 105, such as any one or more of the adhesives mentioned herein or other any other adhesives whether now known or later developed, to form a suspension. The 3D structures 200 may be dispersed evenly throughout the suspension as shown in FIG. 1. The 3D structures 200 are thus applied to the substrate with the adhesive 105. When the substrates are mated together for bonding, the structures 200 are thus dispersed between the substrates.

Due to the elastic nature of some of the materials that may be used to form the structures 200, the structures 200 may have a tendency to remain in a naturally expanded state. When a change in the environment of the bonded substrates occurs, e.g., due to an applied energy on the substrate(s)

from any direction, the applied energy causes the structures 200 to temporarily flex or compress. As a result of the compression of the structures 200, some of the stress to the substrates is diffused from the substrate and transferred to the structures 200. The structures 200 may eventually return to their natural expanded state, and in doing so, return an opposing applied energy to the substrate(s). The opposing applied energy returned to the substrate may be less than the original applied energy. However, due to the structures' 200 ability to diffuse some of the applied energy from the substrate, the substrate may remain relatively undisturbed.

The amount of compression experienced by the structures 200 may be directly related to the strength of the applied energy upon the substrate. It shall be understood that the applied energy can be the result of any type of disturbance to the environment, including but not limited to sound waves, electromagnetic waves, seismic waves, changes in temperature and/or pressure, physical shocks, etc. In the instance of a physical shock, the applied energy received by the substrate, and thus the structures, may be substantially greater than the applied energy received as a result of sound waves. Therefore, the structures 200 may experience a greater degree of compression in order to diffuse the energy from a physical shock than they would to diffuse the energy from sound waves. Several non-limiting examples follow which may help to illustrate various embodiments of the invention.

In one example, an adhesive comprising a plurality of 3D structures 200 (or "damping apparatus") may be used for applying ceramic shingles to the roof of a building. The adhesive may be applied to the underside of the shingles and the shingles applied to the roof in a known manner and according to the best practices for the particular adhesive chosen. During a thunderstorm, the roof may experience hail, which exerts an applied energy on the shingles which, in some instances, may be sufficient that the ceramic shingles would traditionally crack. However, due to the enhanced adhesive having damping apparatus, when the shingles receive an applied energy from the hail, energy is at least partially transferred to the 3D structures such that the structures flex or compress. Here, because the energy may be greater, the structures may experience a greater amount of compression. The structures then return to their natural state due to the elasticity of the structures, which returns an opposing applied energy to the shingle. Having diffused some of the original applied energy, the opposing applied energy that is returned to the shingle is less than the original applied energy. Accordingly, due to the transfer of energy to the structure, the shingle does not crack.

In another example, an adhesive comprising a plurality of 3D structures may be applied around the outer perimeter of a window. Sounds waves travelling through the air hit the window (e.g., on an outside surface), and traditionally would travel through the window to the other side (e.g., an inside surface). However, due to the enhanced adhesive, when the window receives energy from sound waves, the energy is at least partially transferred to the structures. Here, because the energy may be relatively small, the structures may only experience a slight degree of flex or compression. The structures then return to their natural state, thus returning an opposing applied energy to the window. Having diffused some of the original applied energy, the opposing applied energy that is returned to the window is less than the original applied energy. As a result of the diffusion of energy by the structures, the sound waves travelling through the window may be considerably decreased.

Figure 3:
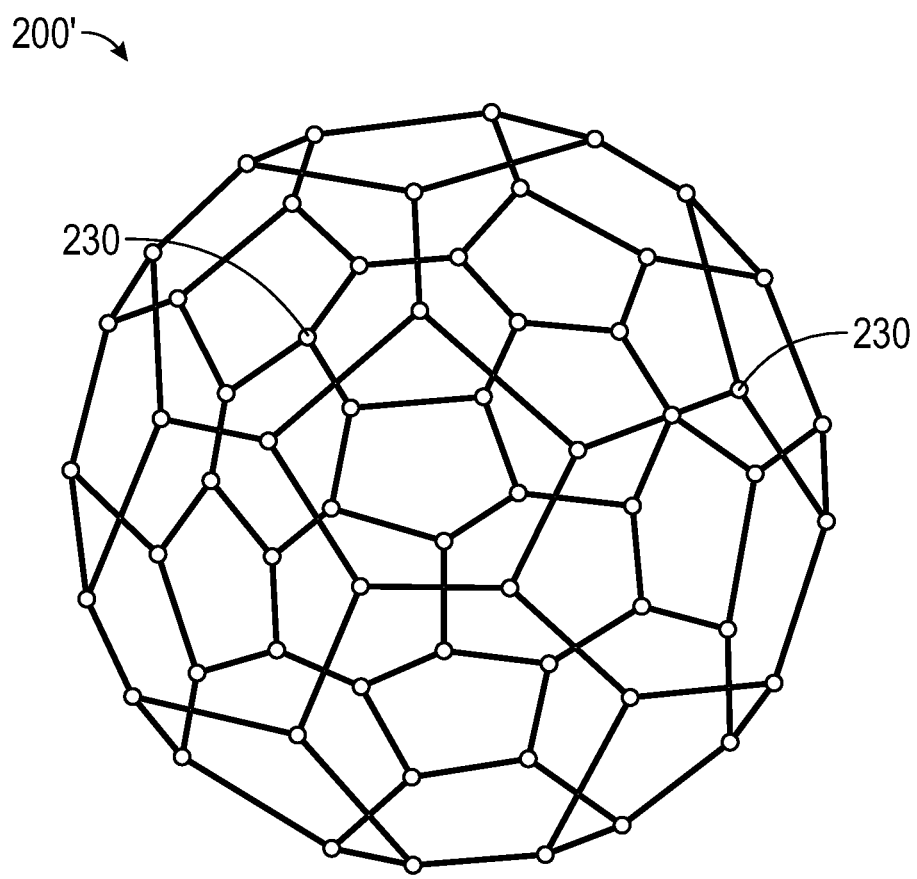
FIG. 3 is a close-up perspective view of another embodiment of a three-dimensional damping apparatus.
Figure 4:
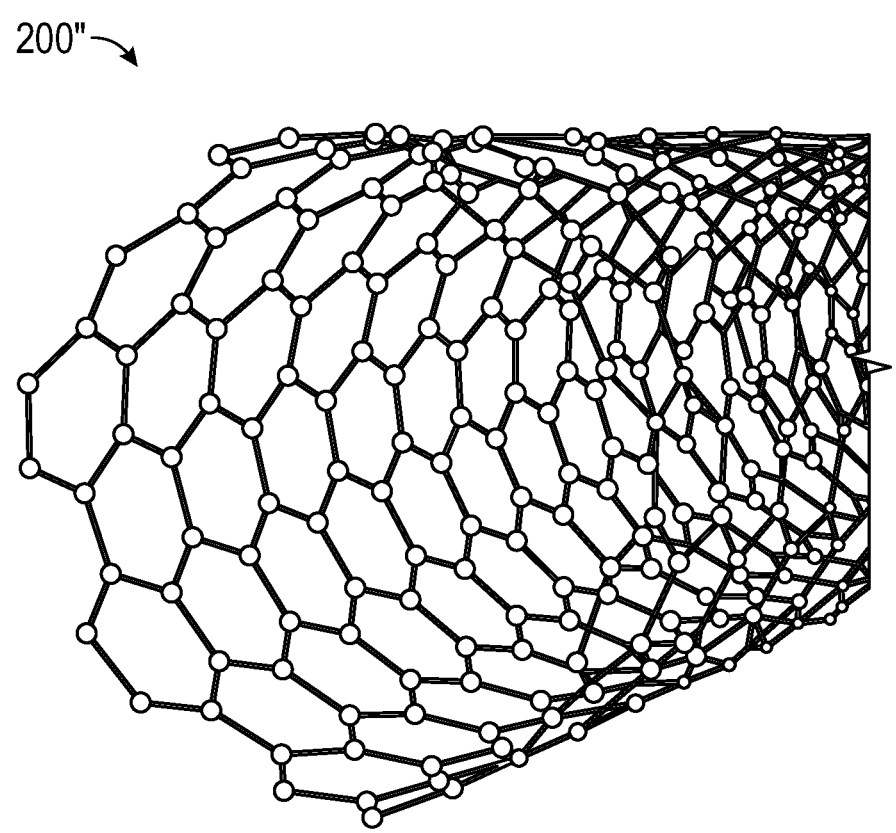
FIG. 4 is a close-up perspective view of still another embodiment of a three-dimensional damping apparatus.

FIG. 3 shows an alternative embodiment 200' of a 3D particle. Here, the particle 200' takes the form of a spheroidal molecule, geodesic dome, or other 3 dimensional shape. Many such particles exist in nature, or have previously been developed, for various applications. Fullerenes are one example of a 3D particle for use in the invention. Fullerenes are a class of allotropes of carbon which are essentially sheets of graphene which can be rolled into tubes or sphere. One example of a fullerene molecule, $C_{60}$, comprises 60 carbon atoms arranged as 20 hexagons and 12 pentagons to form a soccer ball (or buckyball) shaped structure. A $C_{60}$ fullerene molecule is illustrated in FIG. 3. Graphene, for example, may be also be provided as a box-shaped structure (e.g., as a layered structure). FIG. 4 illustrates a nanotube 200"—where the graphene molecules have been rolled into a 3 dimensional tube. A suspension of tubes 200" in an adhesive may preferably result in the nanotubes being dispersed in various orientations, e.g., some oriented vertically, some oriented horizontally, and some oriented at various angles. In this way, the nanotubes may be effective to dampen applied energy received by any substrate at any angle. In one embodiment, the particle comprises a non-magnetic material.

A dendrimer is another example of a 3D particle. Dendrimers are spherical polymeric materials whose properties are usually determined by functional groups appearing on the molecular surface. Dendrimers may be used in the synthesis of monodisperse (i.e., uniform) metallic particles. Poly(amidoamine) dendrimers are often used, and the end result may be a dendrimer-encapsulated particle.

The spheroidal, geodesic dome or other 3D structures may function substantially similarly to the 3D structure as shown in FIG. 2. For example, in the case of $C_{60}$, the bonds between carbon atoms 230 may have some degree of flexibility which allows the molecule to flex or compress when energy is applied to the molecule. It shall be understood that the spheroidal, geodesic, and other 3D structures described herein are exemplary only, and that other 3D structures having similar or compatible properties may additionally be utilized and are contemplated within the scope of the invention.

In one embodiment, it may be preferable for the particle 200, 200' and/or 200" to exhibit magnetic properties. In another embodiment, the particle 200, 200' and/or 200" maybe electrically or electromagnetically active. When suspended in an adhesive, the adhesive may take the form of a ferrofluid, or a liquid (liquid, gel, plasma, etc.) that becomes magnetized in the presence of a magnetic field. As will be described in greater detail below, ferrofluidic adhesives may allow for passive and/or dynamic response to applied energy to a substrate.

Ferrofluid is a unique material that acts like a magnetic solid and like a liquid. Here, by incorporating 3D damping apparatus having magnetic properties into an adhesive, the adhesive may be transformed into a ferrofluid. A ferrofluid is superparamagnetic, allowing the liquid to display magnetic tendencies only in the presence of a magnet. Thus, in order to transform an adhesive from a liquid to a ferrofluid, the damping apparatus must have magnetic properties.

Carbon-based 3D structures, such as $C_{60}$, may be naturally paramagnetic, i.e., behaves like magnets in the presence of a magnetic field. Other 3D structures, such as those manufactured from a polymer, may be coated in, or otherwise incorporate a magnetic material such as iron oxide. It may be desirable for the magnetic material to be coated in a surfactant to keep the magnetic structures from sticking together.

Absent a magnet, the 3D structures may function as described above. In other words, without a magnet, the damping apparatus may simply compress as a result of an applied energy, thus diffusing some of the applied energy away from the substrate. In the presence of a magnetic (or electric) field, however, the adhesive may become an even more effective damper.

In one embodiment, a magnetic field (e.g., using a magnet or a magnetizable material, such as a small rod of iron alloy wrapped in a current-carrying coil, or other means known to those skilled in the art to apply a magnetic field) may be applied evenly at or near the areas of the substrate having the adhesive to influence the orientation of the damping apparatus. This may be most useful in the case of an adhesive suspension comprising tubes. For example, if an applied energy most frequently occurs in a single direction across the substrates, then the magnetic field may be applied such that the tubes are oriented so as to transversely receive the applied energy.

In another embodiment, an applied energy may be received by the substrate in one or more concentrated areas. In this case, a magnetic field may be activated only in the concentrated area(s) receiving the applied energy. Thus, multiple pieces of magnetizable material may be provided at or near the adhesive areas such that multiple magnetic fields may optionally be applied. The magnetic damping apparatus will thus be drawn to the magnetic field(s). An increased concentration of the flexible damping apparatus may thus provide increased flexibility in the area of the magnetic fields. The magnetic field may additionally be operative for orienting the damping apparatus as described above.

The magnetic fields described above may generally be considered static or passive because the magnetic field, when applied, is steady state. In other words, the magnetic field may be turned on, or off, but the magnetic field may not vary, for example, over time, or in response to dynamic changes in the substrate environment.

In still another embodiment, however, the adhesive (e.g., via the structures 200, 200' and/or 200") may be configured for dynamic response to changes in the substrate environment in real time and/or to address potential problems due to power amplification. One or more sensors (e.g., microphones, accelerometers, etc.) configured to sense and measure applied energy (e.g., sound waves, electromagnetic waves, seismic waves, changes in temperature and/or pressure, physical shock), and/or an object's resonating frequency may be applied in or around the adhesive-coated area. As the sensor(s) determines the amount of applied energy received by the substrate, it may transmit a signal (e.g., using a wireless connection over a network, Bluetooth, wired connection, or any other method whether now known or later developed) to a processor, which may be equipped with a program with instructions for evaluating the data received from the sensors and causing a force field to be applied to the damping apparatus to alter the properties of the damping apparatus resulting in an ability to control the response of the substrate to the applied energy. A stronger or weaker force field may be applied depending on the type of applied energy being sensed, and the relative strength of that energy.

As an applied energy, or force energy, is encountered by the substrate, the sensors analyze the applied energy to ascertain the amplitude and frequency spectrum of the applied energy. A force field may be applied at or near the adhesive having damping apparatus dispersed therein to alter the properties of the damping apparatus (e.g., change in orientation, elasticity, etc. of the damping apparatus) in such a way that the damping apparatus experiences a degree of physical displacement at controlled timing intervals based on the frequency spectrum of the applied energy. In one embodiment, the damping apparatus may actually experience controlled oscillations (e.g., physical displacement along a particular distance). The controlled response of the damping apparatus may result in a response force that is in a spread spectrum inverse waveform which may geometrically stabilize the substrate to avoid peak resonant frequencies which may damage the substrate(s). In other words, the controlled adjustments and corresponding response of the damping apparatus may result in a decrease of the amplitude of the applied energy by spreading the applied energy out over time.

For example, in one embodiment, one or more sensors may be placed at or near a substrate (e.g., a window) for detecting sound waves. During peak hours of the day (e.g., high traffic times) the sensors may register higher decibels of sound waves being transmitted and received by the window; conversely, during the evening hours, the sensors may register lower decibels of sound waves. In response, the amount of current pushed to the magnetizable materials may be greater during the day in order to block out unwanted noise than that required during the night.

In another example, a sensor may detect the natural resonance frequency of the substrate. A second sensor (or the same sensor) may detect the frequency of applied energy upon the substrate. If the second sensor detects that the frequency of the applied energy is the same as the natural resonant frequency of the substrate, a magnetic field may be applied (or removed, as the case may be) at or near the adhesive in order to alter the properties of the damping apparatus such that the apparatus may dampen (or alter) the frequency and amplitude of the applied energy as received by the substrate in order to avoid power amplification and possible destruction of the substrate (or structure attached to the substrate). This ability to tune and detune the damping apparatus in real-time in response to a sensed frequency of a substrate or energy applied to a substrate may allow for supremely customizable products onto which the inventive adhesive is applied. It shall additionally be understood that the resonant frequency of the substrate may be altered by the mass or a surface which may be affixed to the adhesive or substrate.

In still another embodiment, the 3D structures 200, 200', and/or 200" may be electrically active damping apparatus, and the adhesive may act as an electrically insulating fluid so as to form an electrorheological adhesive. Applying an electric field (low voltage) at or near the substrate to influence the damping apparatus may allow for a change in the apparent viscosity or the durometer of the adhesive material. An electric field may be applied at or near the adhesive area using known techniques. For example, conducting plates may be provided parallel to each other (e.g., at each substrate). A voltage may be maintained between the plates by passing current through the plates. The apparent change in the viscosity of the adhesive may be directly dependent on the strength of the applied electric field. Thus, as the strength of the applied electric field is increased and/or decreased, the consistency of the adhesive may transition from that of a liquid to a gel, and vice versa (or to and from a more elastic gel to a less elastic gel).

The change in viscosity or durometer of a material may occur over very small time increments, e.g., milliseconds, making the electrorheological adhesive especially useful in conjunction with sensors. For example, in one embodiment, the electrorheological adhesive may be applied to a window.

The conducting plates may optionally be opposing sides of the sash, if the sash is constructed of, for example, aluminum. Alternately, conducting plates may be provided parallel to each other on either side of the sash. The window pane(s) may be placed between the plates. One or more sensors may be placed at or near the window pane(s) to measure applied energy to the window pane(s). If the sensor senses an applied energy over a threshold value, the sensor may transmit a signal to cause an electric field to be applied to the plates. In response, the adhesive (via the damping apparatus) may become stiffer in order to reduce the effects of the applied energy.

While reference is made herein to magnetic fields and electric fields, it shall be understood that the magnetic fields and electric fields may additionally or alternately be other types of force fields which may be used to alter the properties of the damping apparatus. For example, force fields such as subsonic, ultrasonic, electromagnetic, or photonic fields may be applied (using methods known by those skilled in the art) in conjunction with the adhesive having damping apparatus.

Figure 8:
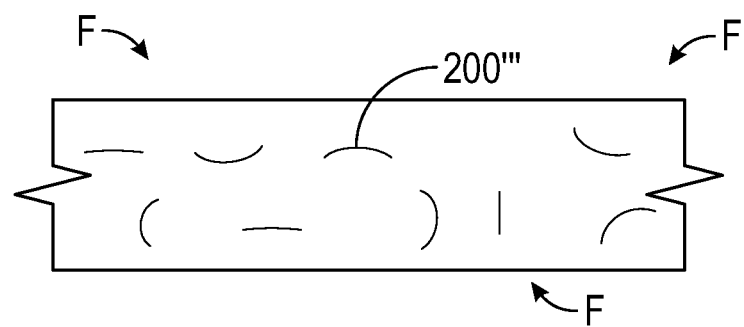
FIG. 8 is a close-up perspective view of an adhesive having three-dimensional damping apparatus dispersed throughout according to another embodiment of the invention.

In still yet another embodiment, the damping apparatus may take the form of piezo element 200''' (as illustrated in FIG. 8). In response to an applied force F, the piezo element 200''' may become deformed. For example, when the piezo element 200''' are bent in one direction due to an applied force, a force field (as described above) may be activated (e.g., via a signal from a sensor) to send electric power to the piezo element 200''' to bend in the other direction. In this way, the response of the pizeo element 200''' may help to reduce the disruption to the substrate.

As noted briefly above, the 3D structure may alternately (or even additionally) be provided in a backing, such as is illustrated in embodiments 300 and 300' of FIGS. 5 and 6, respectively (illustrating a backing 305 with adhesive 105 on both sides and a backing 305' with adhesive 105 only a single side, respectively). One example of an adhesive with a backing is a double-sided foam tape. Double-sided foam tape includes a principal portion (e.g., backing) 305 consisting of foam (or other similar material) and adhesive 105 is applied to opposing sides of the principal portion 305. Any of the 3D damping apparatus 200, 200', and 200'' described herein (or other appropriate 3D structure) may be incorporated into the backing 305. Further, the damping apparatus 200, 200', and 200'' provided in the backing may be configured for dynamically controlled response as a reaction to a force field, as discussed above.

FIGS. 7a and 7b illustrate embodiments 100' and 100'' of the invention incorporating an adhesive tape 107 and damping apparatus 200, 200', and/or 200''. The damping apparatus may be provided on one or both sides of the tape 107 in order to provide damping properties to the tape 107. For example, FIG. 7a illustrates a single-sided tape 107 which has damping apparatus 200 configured to disperse applied energy from a single direction. FIG. 7b, on the other hand, illustrates a double-sided tape 107 which has damping apparatus 200 configured to disperse applied energy from two directions.

Variations of arrangements including combinations of hybrid configurations of smart-materials such as nickel titanium or nitinol can be combined to perform dynamic response by utilizing the properties of shape-memory alloys (SMAs). SMAs and other smart-materials may exhibit properties that allow the molecular alignment to change in physical state (i.e. relative molecular position) based on variations in energy levels experienced by the SMA material. For example, in the form of a wire strand, nitinol varies in length based on the temperature of the SMA itself. In the case of conductive smart-materials such as nitinol, an electric current can be induced into the smart-material/SMA in order to alter the temperature of the SMA—causing the length of the wire to vary based on changes in the wattage dissipated across the SMA wire within the adhesive structure.

Variations of state, position, and structure within SMAs and smart-materials can be exploited to embed SMA wires, pellets, or thin-film strips within the adhesive structure. By varying the SMA's density, position, and relative placement between companion particles the effective resonant mode of the adhesive can be changed based on external stimulus as a controlled response to achieve anti-resonant damping.

Figure 9:
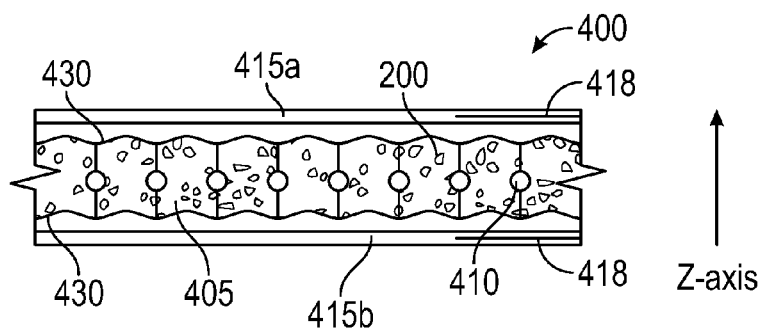
FIG. 9 is a close-up perspective view of a three-dimensional damping adhesive according to still another embodiment of the invention.

As illustrated in FIG. 9, according to embodiment 400, SMA pellets 410 can be dispersed within a mixture of particles 200 to create a layer 405 which may have various properties (e.g., fluid, gel, plasma, etc.) that can be altered in dimension based on externally induced waveforms. The layer 405 may be positioned between two layers of, for example, pressure sensitive adhesive 415a and 415b, which may be equipped with conductive strips or plates 418. Direct contact of the external response waveforms or force fields can be conductive as direct current (DC) or low-frequency (as shown via contacts 430 for DC drive currents or low frequency AC in FIG. 9). Indirect induced waveforms can also be used to capacitively couple electrical energy through the SMA pellets using strategically selected high-frequency alternating current (AC) waveforms which do not require direct electrical contact. One example of an indirect method of induced waveforms is the use of ultra-high-frequencies that are electromagnetically propagated in the form of short-burst pulse streams that are strategically shaped in amplitude, wave shape and frequency to achieve selective resonance of specific particle layers or positions of particle regions along or within a substrate layer. The short-burst pulse streams are managed over time in frequency bursts where the frequencies are generated in alignment with wavelengths and fractional wavelength timings (such as quarter-wave, half-wave, and full-wave periods). These methods can be used to achieve selective areas of resonant tuning (and detuning) in order to vary the durometer of the adhesive layer(s) in real time. In other words, a nearby field of energy can be utilized to vary the anti-resonant damping mode of the adhesive without any direct contact to the adhesive itself.

Figure 10:
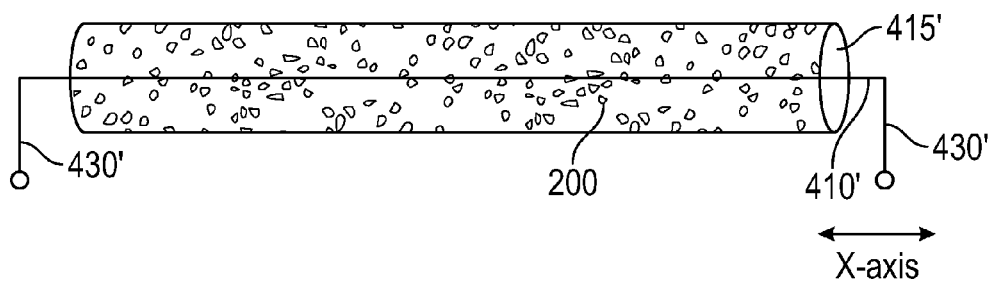
FIG. 10 is a close-up perspective view of a three-dimensional damping adhesive according to still yet another embodiment of the invention.

FIG. 10 is similar to FIG. 9, but illustrates dynamic response along the x-axis. The adhesive 415' may be extruded, for example, and may have a muscle wire 410' (or SMA wire) located within the extrusion. Electric current may be pushed through the wire via leads 430'.

Smart-materials can be somewhat slow to respond due to the thermal mass or other physical properties that can slow response time. This means that there is a limit to the response time (or frequency) of the molecular changes in the smart-material (or SMA) itself. One method of obtaining increased performance is to utilize a harmonic frequency byproduct (based on the changes in the physical properties of the SMA material) to assist in the anti-resonant damping process. For example, a change in SMA structure may be possible in 100's of milliseconds occurring in a repetitive pattern at a fundamental frequency (or rate of change) altering the SMA structural alignment. A resonant byproduct of this movement-pattern can be realized by strategically using the $3^{rd}$ (or $5^{th}$, etc.) harmonic with notable energy that can be used to assist in the anti-resonant tuning and detuning of the adhesive structure for damping. By utilizing a higher frequency harmonic as the controlled response damping, you can achieve this result by providing a much lower rate of change to the molecular smart-material/SMA and achieve higher frequency movements in the substrate structure for damping. The net result allows slow movements within the adhesive structure to provide damping to higher frequency vibrations which in turn enhance damping performance of the adhesive.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A damping system for reducing the effects on a substrate caused by a disruption in the substrate environment, comprising:
    an adhesive component comprising a backing and an adherent on at least one side of the backing; and
    a plurality of three-dimensional particles dispersed within the backing; and
    a sensor for measuring an amplitude and frequency spectrum of the disruption;
    wherein:
    in a use configuration, the adherent is adhered to a substrate, and the disruption received by the substrate causes the particles to oscillate between a first and second position, the oscillation causing an opposing force on the substrate which is less than the disruption received by the substrate, the oscillation acting to reduce the effects of the disruption; and
    the sensor determines the amplitude and frequency spectrum of the disruption received by the substrate.

2. The damping system of claim 1, wherein the disruption is at least one of a sound wave, an electromagnetic wave, seismic waves, a change in temperature, a change in pressure, and a physical force.

3. The damping system of claim 2, wherein the particle is one of a three-dimensional structure having a plurality of spokes extending radially from a core, a spheroid, and a nanotube.

4. The damping system of claim 1, wherein the first position is an expanded state and the second position is a compressed state.

5. The damping system of claim 1, further comprising a force generating device; wherein, the force generating device provides an applied force to the damping system, the applied force being dependent on the amplitude and frequency spectrum of the disruption.

6. The damping system of claim 5, wherein the disruption is at least one of a sound wave, an electromagnetic wave, seismic waves, a change in temperature, a change in pressure, and a physical force.

7. The damping system of claim 5, wherein the applied force causes the particles to oscillate, the oscillations acting to reduce the amplitude and frequency of the disruption on the substrate.

8. The damping system of claim 7, wherein the applied force is one of a magnetic field, an electric field, a subsonic field, an ultrasonic field, and an electromagnetic field.

9. The damping system of claim 5, wherein the sensor sends a signal to the force generating device the signal initiating the applied force.

10. The damping system of claim 1, further comprising a plurality of three-dimensional particles dispersed within the adherent.

11. The damping system of claim 10, wherein the plurality of three-dimensional particles dispersed within the backing and the plurality of three-dimensional particles dispersed within the adherent are the same type of particles.

12. The damping system of claim 10, wherein the plurality of three-dimensional particles dispersed within the backing and the plurality of three-dimensional particles dispersed within the adherent are different types of particles.

* * * * *